(12) United States Patent
Shieh et al.

(10) Patent No.: US 7,466,711 B2
(45) Date of Patent: Dec. 16, 2008

(54) SYNCHRONOUS SYSTEM AND METHOD FOR PROCESSING A PACKET

(75) Inventors: Shiuh-Pyng Shieh, Hsinchu (TW); Yung-Zen Lai, Yilan (TW); Fu-Yuan Lee, Taoyuan Hsien (TW)

(73) Assignee: Accton Technology Corporation, Hsinchu (TW)

( * ) Notice: Subject to any disclaimer, the term of this patent is extended or adjusted under 35 U.S.C. 154(b) by 736 days.

(21) Appl. No.: 10/742,064

(22) Filed: Dec. 20, 2003

(65) Prior Publication Data
US 2004/0258078 A1 Dec. 23, 2004

(30) Foreign Application Priority Data
Jun. 20, 2003 (TW) .............................. 92116893 A

(51) Int. Cl.
*H04L 12/28* (2006.01)
*H04L 12/56* (2006.01)
(52) U.S. Cl. ....................... 370/401; 370/400; 370/402; 370/392; 370/429; 718/105
(58) Field of Classification Search ................. 370/395, 370/400, 401, 402, 335, 389–392, 355, 235, 370/412–419, 386, 395.1, 230, 238, 395.31, 370/220, 369, 218, 225, 252, 428–429; 718/105; 709/200, 238–244
See application file for complete search history.

(56) References Cited

U.S. PATENT DOCUMENTS

| | | | | |
|---|---|---|---|---|
| 5,544,150 | A * | 8/1996 | Fujimoto et al. | 370/248 |
| 6,604,147 | B1 * | 8/2003 | Woo | 709/240 |
| 6,633,563 | B1 * | 10/2003 | Lin et al. | 370/389 |
| 7,016,367 | B1 * | 3/2006 | Dyckerhoff et al. | 370/429 |
| 2002/0097724 | A1 * | 7/2002 | Halme et al. | 370/392 |
| 2004/0063455 | A1 * | 4/2004 | Eran et al. | 455/525 |
| 2004/0114598 | A1 * | 6/2004 | Veerepalli et al. | 370/394 |
| 2004/0156399 | A1 * | 8/2004 | Eran | 370/913 |
| 2004/0240473 | A1 * | 12/2004 | Kumar et al. | 370/474 |
| 2006/0227811 | A1 * | 10/2006 | Hussain et al. | 370/503 |
| 2007/0027986 | A1 * | 2/2007 | Joshi et al. | 709/224 |
| 2007/0195777 | A1 * | 8/2007 | Tatar et al. | 370/392 |
| 2008/0153453 | A1 * | 6/2008 | Bachmutsky | 455/404.1 |

* cited by examiner

*Primary Examiner*—Edan Orgad
*Assistant Examiner*—Chuong T Ho
(74) *Attorney, Agent, or Firm*—WPAT., P.C.; Justin King

(57) ABSTRACT

A system and method for synchronously processing a packet are disclosed, which improve the speed of processing the packet by using a load balancing mechanism. The system comprises a switch and a clustered architecture for processing the packet. The switch is for receiving and transmitting the packet. The clustered architecture contains packet processing devices and receives the packet from the switch. All packet processing devices can synchronously process the packet. Each packet processing device has a non-duplicate device number.

2 Claims, 4 Drawing Sheets

| Host number | Data amount Processed | Priority position |
|---|---|---|
| 45 | 0 kb | 1 |
| 46 | 0 kb | 2 |
| 47 | 0 kb | 3 |
| 48 | 0 kb | 4 |

| Host number | Priority position |
|---|---|
| 41 | 1 |
| 42 | 2 |
| 43 | 3 |
| 44 | 4 |

Fig. 4 A

| Host number | Priority position |
|---|---|
| 41 | 4 |
| 42 | 1 |
| 43 | 2 |
| 44 | 3 |

Fig. 4 B

| Host number | Data amount Processed | Priority position |
|---|---|---|
| 45 | 0 kb | 1 |
| 46 | 0 kb | 2 |
| 47 | 0 kb | 3 |
| 48 | 0 kb | 4 |

Fig. 5 A

| Host number | Data amount Processed | Priority position |
|---|---|---|
| 45 | 4 kb | 2 |
| 46 | 2 kb | 1 |
| 47 | 10 kb | 3 |
| 48 | 12 kb | 4 |

Fig. 5 B

SYNCHRONOUS SYSTEM AND METHOD FOR PROCESSING A PACKET

BACKGROUND OF THE INVENTION

1. Field of Invention

The present invention relates to packet processing system and method. More particularly, the present invention relates to a synchronous packet processing system that employs a clustered architecture to achieve load balance and thereby increase the speed of packet processing, and a packet processing method using a load balancing mechanism.

2. Description of Related Art

In the field of network communication, many emerging Internet applications have accentuated the need for security mechanisms on the Internet. To relieve software engineers of developing proprietary security protocols, IP (Internet Protocol) security protocol (IPsec) suites provide security services such as authentication, integrity and confidentiality. One application of an IPsec is in the construction of a Virtual Private Network (VPN), which allows two subnets to build secure connections over the public Internet.

An IPsec is an integration of various security techniques. It establishes a safe tunnel between two gateways so that the data transmitted in the tunnel cannot be extracted by anyone unauthorized. The various security techniques include Diffie-Hellman Key Agreement Standard, Data Encryption Standard (DES), Ron's Code 4 (RC4), International Data Encryption Algorithm (IDEA), Message Digest 5 (MD5), Secure Hash Algorithm (SHA) and Digital Signature.

An IPsec is a protocol set composed of several subprotocols, and the subprotocols include: Internet Key Exchange (IKE), IP Authentication Header (IP AH), IP Encapsulating Security Payload (IP ESP). The protocol most frequently used to implement IKE is Internet Security Association Key Management Protocol (ISAKMP). ISAKMP is used to define the procedural environment, such as DES, adopted in the data transmission between two corresponding hosts deploying an IPsec.

The subprotocols of an IPsec are used for data source verification, data completeness verification, and data security verification of the data transmission between two corresponding physical network hosts in a network layer. Data source verification and data completeness verification are achieved through IP AH, whereas data security verification is achieved through IP ESP.

FIG. 1 is a diagram of a simple system architecture employing an IPsec. The above-mentioned procedural environment is defined as a security association (SA), and the SA is established through IKE. Each SA is unidirectional, so if an IPsec is to be applied between two corresponding hosts shown in FIG. 1 a SA from the first host 10 to the second host 11 and a SA from the second host 11 to the first host 10 must be established. For establishing the SA from the first host 10 to the second host 11 through IKE, a unique SA is defined according to a security parameter index (SPI) and the IP address of the first host 10. Under an IPsec, after the first host 10 makes a data packet to be delivered into an encrypted packet having an SPI through IP AH or IP ESP, the encrypted packet is delivered to the second host 11 through the Internet. After receiving the encrypted packet, the second host 11 finds a corresponding SA according to the SPI of the encrypted packet, and the second host 11 processes the encrypted packet in the procedural environment defined by the SA. In addition, when making a data packet to be delivered into an encrypted packet through IP AH, the first host 10 also assigns a sequence number to the packet, so that the second host 11 determines whether the encrypted packet had ever been received or not by recording the sequence number of the encrypted packet. If the second host 11 finds that the encrypted packet had ever been received, the encrypted packet will be discarded by the second host 11 to avoid replay attack.

FIG. 2 is a diagram of another simple system architecture employing an IPsec. In FIG. 2, the first host 10 and the second host 11 are both security gateways. Under this architecture, end user computers 21-28 can use the tunnel mode provided by the IPsec through the first host 10 and the second host 11, so that when data is delivered between end user computers 21-24 and end user computers 25-28 the transmitted data packet will not be extracted or mimicked in the Internet. The transmitted packet according to an IPsec contains at least a non-duplicate sequence number, a SPI, a source address and a destination address. The source address refers to the sending source of the packet, and the destination address refers to the destination of the packet.

Besides, under an IPsec, data packet processing involves a lot of encryption/decryption procedures, and when the number of end user computers increases, the load of security gateways becomes increasingly heavy. When the load of security gateways is excessive normal operations of the security gateways cannot be performed properly, with the result that the whole network communication is slowed down or even interrupted. Therefore, another method or architecture is indeed needed to prevent security gateways from being the bottleneck of the entire network communication. When the security gateways are implemented by adopting clustered architecture, the potential bottleneck due to the security gateways can be avoided, and the problem of network communication interruption due to a single security gateway's failure to operate normally can also be avoided.

In security gateways employing the clustered architecture, a load balancing mechanism is needed in order that encrypted packets to be processed can be distributed evenly to different packet processing devices, thereby increasing the overall speed of processing the encrypted packets. Besides, each packet processing device in the security gateways employing the clustered architecture must in real time acknowledge the SAs established by other packet processing devices, in order that each packet processing device can find the corresponding SA according to the SPI associated with it. Also, during the generation of SAs, a SPI must be correctly associated with a particular SA. Each packet processing device should be able to correctly assign a sequence number to and record a sequence number of an encrypted packet.

Current load balancing mechanisms are, however, suitable for processing packets that are not associated with each other. Under those mechanisms, a SA generated by a packet processing device cannot in real time and synchronously be acknowledged by other packet processing devices, with the result that other packet processing devices cannot find the corresponding SA according to the SPI associated with it. Instead they have to establish another SA, thus the purpose of load balance cannot be effectively achieved. Moreover, due to the way in which packets are processed in current load balancing mechanisms, there exists a problem on the consistency of the correspondence between a SPI and a particular SA. Under current load balancing mechanisms, each packet processing device cannot prevent replay attack by recording the sequence number of an encrypted packet.

SUMMARY OF THE INVENTION

A main objective of the present invention is to provide a packet processing system and a packet processing method to increase the overall speed of processing packets.

Another objective of the present invention is to provide a packet processing system in which all packet processing devices can in real time and synchronously acknowledge the same SA, thereby synchronously processing packets.

Another objective of the present invention is to provide a packet processing system in which all packet processing devices can in real time and synchronously associate a correct SPI with each SA, thereby effectively processing packets.

Still another objective of the present invention is to provide a packet processing system in which each packet processing device can in real time and synchronously assign a sequence number to and record a sequence number of a packet, thereby effectively processing packets.

According to an embodiment of the present invention, a packet processing system employs clustered architecture, which facilitates load balancing, and the speed of processing encrypted packets is increased. A synchronous packet processing system includes at least a switch and packet processing devices. The switch is for receiving and transmitting a packet. Packet processing devices are for synchronously receiving the packet and processing a sequence number of the packet. One of the packet processing devices is selected to process the packet, and each of the packet processing devices has a non-duplicate device number.

According to an objective of the present invention, a packet processing method is presented which includes the following steps. First, packet processing devices and at least a switch are provided. The packet processing devices are enabled to synchronously receive a packet from the at least a switch. A security association is established between a source and a destination of the packet. The packet processing devices are enabled to synchronously assign a sequence number to the packet. One of the packet processing devices is selected according to a load balancing mechanism to continue to process the packet through the security association. Finally, the packet is delivered to the destination.

The foregoing and other features, aspects, and advantages of the present invention will become better understood with reference to the following description, drawings and appended claims.

BRIEF DESCRIPTION OF THE DRAWINGS

The invention can be more fully understood by reading the following detailed description of the preferred embodiments, with reference made to the accompanying drawings as follows:

FIG. 4A and FIG. 4B are diagrams illustrating the Round-Robin dispatch fashion; and FIG. 5A and FIG. 5B are diagrams illustrating the Shortest-Queue-First dispatch fashion.

DESCRIPTION OF THE PREFERRED EMBODIMENTS

Figure 1:
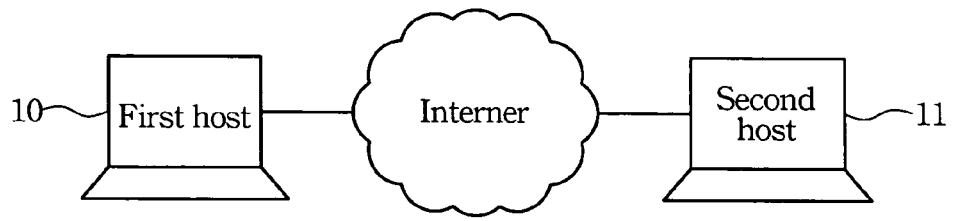
FIG. 1 is a diagram of a simple system architecture employing an IPsec.
Figure 2:
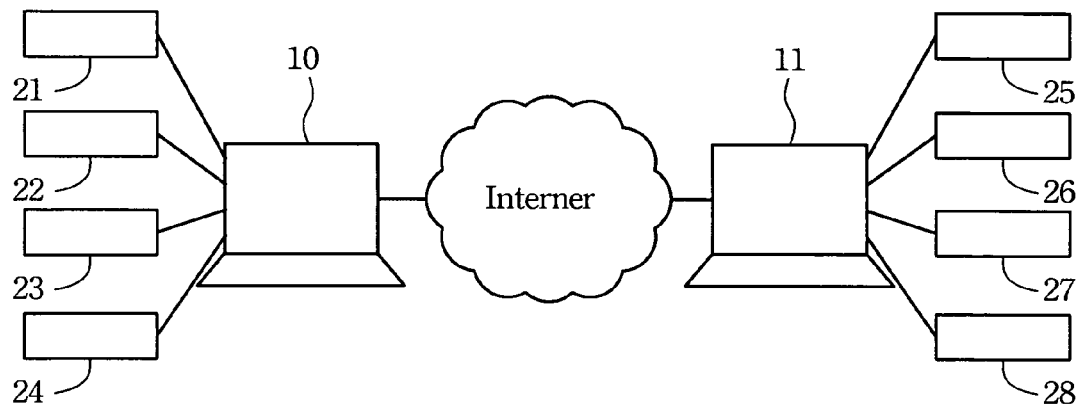
FIG. 2 is a diagram of another simple system architecture employing an IPsec.
Figure 3:
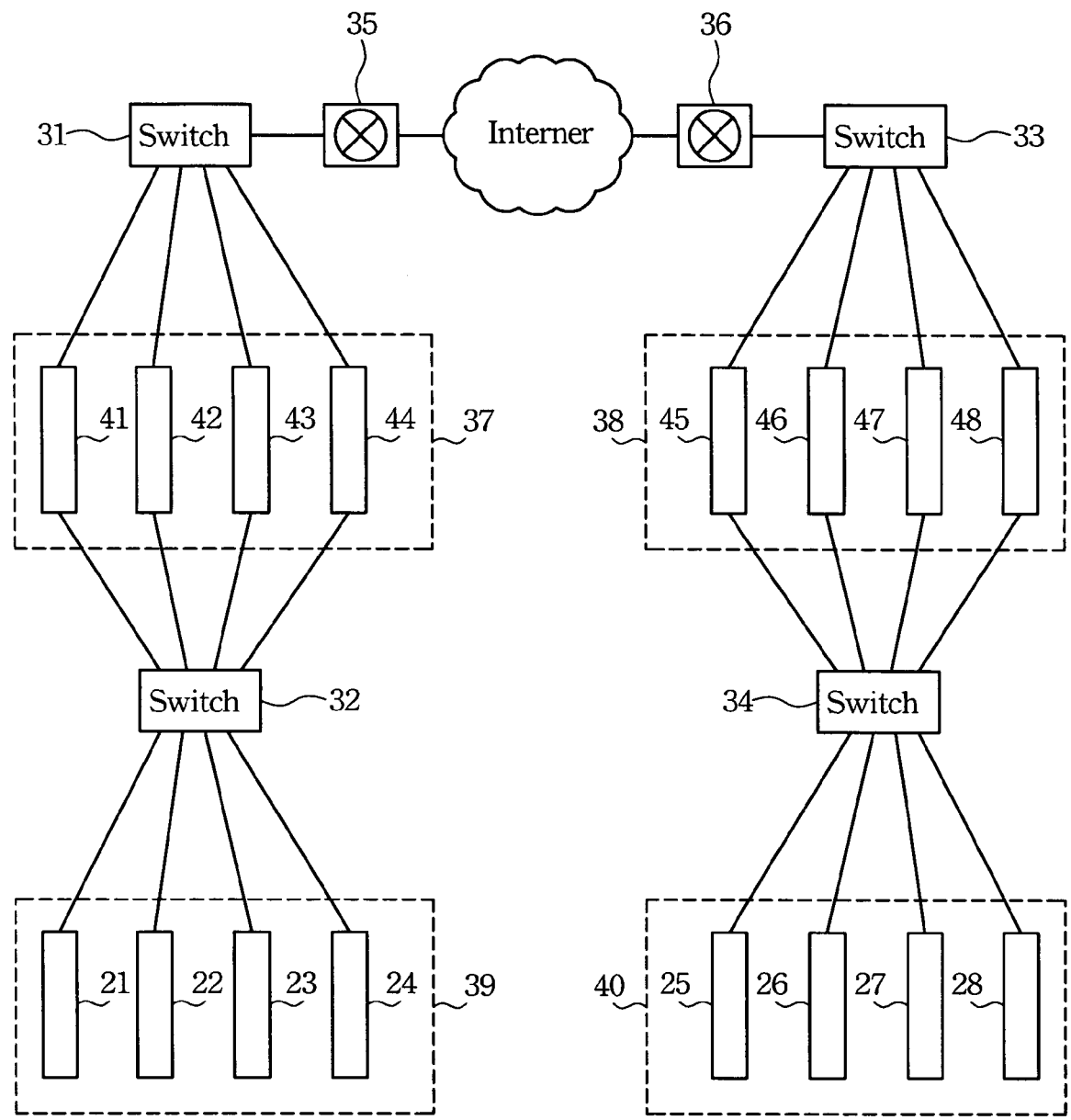
FIG. 3 is a diagram of a system architecture in which the present invention can be embodied.

With reference to FIG. 3, the present invention can be embodied in a system that includes local area networks 39, 40, switches 31-34, packet processing devices groups 37, 38 and routers 35, 36, Each of all packet processing devices in packet processing devices groups 37, 38 has a non-duplicate device number. Local area networks 39, 40 can access and deliver data packets via distribution switches 32, 34. As far as local area networks 39, 40 are concerned, both packet processing devices groups 37, 38 act as a virtual router by way of network switches 31, 33 and routers 35, 36. In FIG. 3 no additional cooperating means is needed to facilitate the operation of client side computers 21-28 in local area networks 39, 40, and the network communication speed between client side computers 21-24 and client side computers 25-28 in accordance with an IPsec can increase.

The cooperation between the packet processing devices group 37 and the distribution switch 32 can process packets sent from client side computers 21-24 in local area network 39, and afterwards the packets are delivered to the packet processing devices group 38 through the network switch 31. When this is being done, the synchronous operation in the packet processing devices group 37 is mainly for processing the packets and then delivering them to the packet processing devices group 38.

Accordingly, the cooperation between the packet processing devices group 38 and the network switch 33 can receive via Internet (external network) and process the packets to be delivered to the packet processing devices group 38 and sent from the packet processing devices group 37. When this is being done, the synchronous operation in the packet processing devices group 38 is mainly for processing the packets and then delivering them to client side computers 25-28 in the local area network 40.

Under an IPsec, the operation of packet processing depends on SAs between packet processing devices groups 37, 38. The following descriptions are directed to three cases for different conditions about the establishment of SAs between packet processing devices groups 37, 38. The first case is that SAs are to be established first between packet processing devices groups 37, 38 and then packets transmitted. The second case is that SAs are already established before the sending of packets from the local area network 39 through the packet processing devices group 37. The third case is that SAs are already established before the receiving of packets by the local area network 40 through the packet processing devices group 38.

First Embodiment

In this embodiment SAs are to be established first between packet processing devices groups 37, 38 and then packets transmitted. When the client side computer 21 in the local area network 39 sends a packet in accordance with an IPsec to the client side computer 25 in the local area network 40, the packet processing devices group 37 synchronously receives this packet via the switch 32. However, if the client side computer 21 has never sent a packet to the client side computer 25, a SA between the source and destination of the packet must be established first through IKE before sending.

After a SA is established, the packet processing devices group 37 receiving the packet synchronously assigns an identical sequence number to the packet in order to achieve an IPsec's anti-replay attack function.

While the flow of packets is very heavy, the packet processing devices group 37 employs a load balancing mechanism to increase the overall speed of processing packets. Under this mechanism, a packet processing device in the packet processing devices group 37 is chosen, for example the packet processing device with the host number 41, to process the packet. It then delivers the packet through the Internet to the packet processing devices group 38, which processes the packet and then sends it to the client side computer 25.

The above series of events and actions can be summarized as a packet processing method including the following procedures: providing packet processing devices and at least a switch; enabling the packet processing devices to synchronously receive a packet from the at least a switch; establishing a security association between a source and a destination of the packet; enabling the packet processing devices to synchronously assign a sequence number to the packet; selecting one of the packet processing devices according to a load balancing mechanism to continue to process the packet through the security association; and delivering the packet to the destination.

The load balancing mechanism described above can, for example, deploy a Round-Robin dispatch scheme and/or a Shortest-Queue-First dispatch scheme to find which node (packet processing device) should be responsible for a new packet when it comes. Furthermore, the same load balancing mechanism is used for all conditions.

FIG. 4A and FIG. 4B are diagrams illustrating the Round-Robin dispatch fashion. The order of processing for the packet processing devices is initially arranged. For example, the initial packet processing priority order conforms to the size sequence of every packet processing device's host identity, or host number. In FIG. 4A host numbers 41-44 and the initial priority order of the packet processing devices in the packet processing devices group 37 in FIG. 3 are listed. As shown in FIG. 4A, the smaller the host number of a packet processing device, the higher the device's initial priority is set. The packet processing device with the host number 41 initially has the highest priority, and thus a priority position of 1. After the packet processing device with the host number 41 processes an encrypted packet, it becomes the device with the lowest priority (priority position of 4), and the priority positions of the devices with the host numbers 42, 43, 44 switch to 1, 2, 3 respectively, as shown in FIG. 4B. The priority positions circulate in this manner among the devices having the host numbers 41, 42, 43, and 44, respectively.

A load balancing mechanism employing a Round-Robin dispatch scheme can be summarized as follows: assigning a packet processing priority order to the packet processing devices; processing the packet by one with the highest priority position in the packet processing priority order of the packet processing devices; and circulating the packet processing priority order of the packet processing devices and repeating the processing step for following packets.

FIG. 5A and FIG. 5B are diagrams illustrating the Shortest-Queue-First dispatch fashion. In Shortest-Queue-First dispatch fashion the order of processing for the packet processing devices is dynamically arranged according to the amount of data of packets already processed by each packet processing device. The order of processing for the packet processing devices is initially arranged. For example, the initial packet processing priority order conforms to the size sequence of every packet processing device's host identity, or host number. In FIG. 5A host numbers 45-48, initial amounts of data already processed by and the initial priority order of the packet processing devices in the packet processing devices group 38 in FIG. 3 are listed. The smaller the host number of a packet processing device, the higher the device's initial priority is set. For instance, the packet processing device with the host number 45 initially has the highest priority, and thus a priority position of 1.

Also as shown in FIG. 5A and FIG. 5B, the unit of measure for the amount of data processed by each packet processing device is kilo-byte (abbreviated as kb). Initially the amounts of data processed by the packet processing devices are all 0 kb.

While processing packets and after all of the packet processing devices are selected in the initial priority order to respectively process the packets and each store a data amount of each of the packets, priority positions of the packet processing devices change according to the cumulative stored data amount of encrypted packets already processed by each packet processing device. As shown in FIG. 5B, the smaller the cumulative size of data already processed by a packet processing device, the higher the device's priority for processing the subsequent packet is set. In FIG. 5B, the packet processing device with the host number 46 has the smallest cumulative size of data processed of 2 kb, so its priority for processing the subsequent packet is set to be the highest (priority position of 1). The packet processing device with the host number 48 has the largest cumulative size of data processed of 12 kb, so its priority for processing the subsequent packet is set to be the lowest (priority position of 4). The priority positions dynamically change in this manner to balance the load in every one of the devices having the host numbers 45, 46, 47, and 48 respectively.

A load balancing mechanism employing a Shortest-Queue-First dispatch scheme can be summarized as follows: assigning a packet processing priority order to the packet processing devices; processing a plurality of packets by using the packet processing devices in the packet processing priority order, and storing in each of the packet processing devices a data amount of each of the plurality of packets; and assigning a new packet processing priority order to the packet processing devices according to a cumulative data amount stored in each of the packet processing devices, such that the lower the cumulative data amount, the higher a new priority position in the new packet processing priority order is given to a particular one of the packet processing devices with the cumulative data amount, and repeating the processing step by using the packet processing devices in the new packet processing priority order.

Second Embodiment

The second embodiment is described here with reference to FIG. 3. In this embodiment SAs are already established before the sending of packets from the local area network 39 through the packet processing devices group 37. When the client side computer 21 in the local area network 39 is sending a packet in accordance with an IPsec to the client side computer 25 in the local area network 40, the packet processing devices group 37 synchronously receives this packet via the switch 32. If the client side computer 21 has ever sent a packet/packets to the client side computer 25, a SA between the client side computer 21 and the client side computer 25 has already been established in the packet processing devices group 37. Therefore, the packet processing devices group 37 can locate the corresponding SA according to the source (the client side computer 21) and destination (the client side computer 25) of the packet.

After the corresponding SA is located, the packet-processing devices group 37 synchronously assigns an identical sequence number to this packet in order to achieve an IPsec's anti-replay attack function.

While the flow of packets is very heavy, the packet processing devices group 37 employs the same load balancing mechanisms as described in the first embodiment above to increase the overall speed of processing packets. Under the mechanisms, a packet processing device in the packet processing devices group 37 is chosen, for example the packet processing device with the host number 42, to continue to process the packet. The packet processing device with the host number 42 then delivers this packet through the Internet to the packet processing devices group 38, which processes the packet and then sends it to the client side computer 25.

The above series of events and actions can be summarized as a packet processing method including the following procedures: providing packet processing devices and at least a switch; enabling the packet processing devices to synchronously receive a packet from the at least a switch; locating a security association according to a source and a destination of the packet; enabling the packet processing devices to synchronously assign a sequence number to the packet; selecting one of the packet processing devices according to a load balancing mechanism to continue to process the packet through the security association; and delivering the packet to the destination.

Third Embodiment

The third embodiment is described here with reference to FIG. 3. In this embodiment SAs are already established before the receiving of packets by the local area network 40 through the packet processing devices group 38. When the client side computer 21 in the local area network 39 is sending a packet, which has a SPI and a sequence number, in accordance with an IPsec to the client side computer 25 in the local area network 40, the packet processing devices group 38 synchronously receives this packet via the switch 33. If the client side computer 21 has ever sent a packet/packets to the client side computer 25, a SA between the client side computer 21 and the client side computer 25 has already been established in the packet processing devices group 38. Therefore, the packet processing devices group 38 can locate the SA according to the SPI of the packet.

Before locating the SA, the packet processing devices group 38 synchronously records the sequence number of this packet on a table. If the sequence number of this packet received is already on the table before recording, the packet processing devices group 38 discards the packet to achieve an IPsec's anti-replay attack function. If the sequence number is not on the table before recording, the packet processing devices group 38 locates the SA according to the SPI of the packet.

Similarly, after the SA is located, the packet processing devices group 38 employs the same load balancing mechanisms as described in the first embodiment above to increase the overall speed of processing packets. Under the mechanisms, a packet processing device in the packet processing devices group 38 is chosen, for example the packet processing device with the host number 45, to continue to process the packet. The packet processing device with the host number 45 then delivers this packet through the switch 34 to the client side computer 25.

The above series of events and actions can be summarized as a packet processing method including the following procedures: providing packet processing devices and at least a switch; enabling the packet processing devices to synchronously receive a packet having a sequence number and a security parameter index from the at least a switch; enabling the packet processing devices to synchronously record the sequence number on a table; locating a security association according to the security parameter index; selecting one of the packet processing devices according to a load balancing mechanism to continue to process the packet through the security association; and delivering the packet to a destination.

In summary, using the packet processing system and method provided by the present invention can increase the overall speed of packet processing under the application of an IPsec, and satisfy the requirements of the IPsec.

Although the present invention has been described in considerable detail with reference to certain preferred embodiments thereof, other embodiments are possible. Therefore, the spirit and scope of the appended claims should no be limited to the description of the preferred embodiments contained herein.

What is claimed is:

1. A packet processing method, comprising:
   providing a plurality of packet processing devices and at least a switch;
   having said plurality of packet processing devices to synchronously receive a packet having a sequence number and a security parameter index from said switch;
   having said plurality of packet processing devices to synchronously record said sequence number on a table;
   locating a security association according to said security parameter index;
   selecting one of said plurality of packet processing devices according to a load balancing mechanism to continue to process said packet though said security association; and
   delivering said packet to a destination wherein said load balancing mechanism comprises:
   assigning a packet processing priority order to said plurality of packet processing devices; processing a plurality of said packets by using said plurality of packet processing devices in said packet processing priority order, and storing in each of said plurality of packet processing devices a data amount of each of said plurality of said packets; and assigning a new packet processing priority order to said plurality of packet processing devices according to a cumulative data amount stored in each of said plurality of packet processing devices, such that the lower the cumulative data amount, the higher a new priority position in said new packet processing priority order is given to a particular one of said plurality of packet processing devices with the cumulative data amount, and repeating said processing step by using said plurality of packet processing devices in said new packet processing priority order.

2. The method of claim 1, wherein said load balancing mechanism comprises:
   assigning a packet processing priority order to said plurality of packet processing devices;
   processing said packet by one, with the highest priority position in said packet processing priority order, of said plurality of packet processing devices; and
   circulating said packet processing priority order of said plurality of packet processing devices and repeating said processing step for following packets.

* * * * *